United States Patent [19]

Strange et al.

[11] Patent Number: 4,633,367

[45] Date of Patent: Dec. 30, 1986

[54] PRESSURE SENSITIVE FAULT CURRENT INTERRUPTER FOR METALLIZED FILM CAPACITORS WITH OIL IMPREGNATE

[75] Inventors: Thomas F. Strange; John W. Carino, both of Columbia, S.C.

[73] Assignee: North American Philips Corporation, New York, N.Y.

[21] Appl. No.: 802,784

[22] Filed: Nov. 27, 1985

[51] Int. Cl.$^4$ .................. H01G 1/06; H01G 9/00
[52] U.S. Cl. ..................... 361/272; 361/433
[58] Field of Search ......... 361/272, 275, 433, 327–331

[56] References Cited

U.S. PATENT DOCUMENTS

| | | | |
|---|---|---|---|
| 4,308,569 | 12/1981 | Rheindorf | 361/327 X |
| 4,398,782 | 8/1983 | Markarian | 361/306 X |
| 4,577,257 | 3/1986 | Erhardt et al. | 361/272 |
| 4,586,107 | 4/1986 | Price | 361/272 |

FOREIGN PATENT DOCUMENTS

| | | | |
|---|---|---|---|
| 2336727 | 2/1975 | Fed. Rep. of Germany | 361/275 |
| 2246043 | 4/1975 | France | 361/272 |

*Primary Examiner*—Donald A. Griffin
*Attorney, Agent, or Firm*—Jack E. Haken; James J. Cannon, Jr.

[57] ABSTRACT

A pressure sensitive fault interrupter for an oil impregnated metallized AC motor start and motor run capacitor having a dome-shaped diaphragm secured to one contact electrode bridge at the base of the capacitor roll such that a rise in pressure within said roll will cause the dome of said diaphragm to be depressed, thereby breaking electrical contact of one electrode, thus isolating the capacitor from its power supply.

7 Claims, 1 Drawing Figure

PRESSURE SENSITIVE FAULT CURRENT INTERRUPTER FOR METALLIZED FILM CAPACITORS WITH OIL IMPREGNATE

CROSS-REFERENCE TO RELATED APPLICATION

This application is related to U.S. patent application Ser. No. 749,615, filed June 27, 1985, entitled "Pressure Sensitive Fault Interrupter", Thomas F. Strange and John W. Carino, inventors, and assigned to the assignee of the present application.

BACKGROUND OF THE INVENTION

1. Field of the Invention

The invention pertains to the field of oil-filled metallized film AC motor start and motor run capacitors and in particular to such capacitors having a pressure sensitive fault interrupter.

2. Description of the Prior Art

The literature on wet metallized film capacitors with fault interrupters is extensive. Typical recent U.S. patents are U.S. Pat. Nos. 4,398,782 and 4,454,561. The problem encountered with most prior art oil film capacitors is basically an economic problem. The prior art capacitors have a fairly complex construction, are costly to manufacture and some fail to meet the recently upgraded safety standards for fault interruption. The object of the present invention is to overcome the cost disadvantage of the prior art with a simplified design which will also satisfy current electrical safety standards.

A further object of the invention is to permit a fault interruption without deforming the capacitor case.

SUMMARY OF THE INVENTION

This invention pertains to a metallized film AC motor start or motor run capacitor with an oil impregnate having a pressure sensitive fault interrupter. The purpose of such a capacitor is to electrically isolate the metallized film capacitor from a power source when the capacitor has developed a complete or a partial short within the windings of the capacitor itself. During a fault, defined as a complete or partial short between the terminals of the capacitor and internal to the capacitor roll, pressure is developed within the capacitor roll as a result of the breakdown of the dielectric, producing various gases. These gases are able to exit the roll at the ends only. The device utilizes the pressure developed at one end of the roll or any part thereof to depress a diaphragm located at one end of the capacitor roll, such that the action of depressing the diaphragm breaks the electrical contact and electrically isolates the capacitor from the mains, thus stopping a further reaction within the roll.

A pressure sensitive fault interrupter is preferred to a temperature sensitive or temperature dependent fault interrupter because when a fault does occur, the pressure within a capacitor housing will rise significantly faster than the temperature. In many prior art metallized film fault interrupter designs, the rapid rise in pressure will cause an explosion before a temperature sensitive interrupter is activated.

In a typical oil impregnated metallized AC motor run capacitor, the ends of the capacitor foil roll are schooped and/or end sprayed with tin, zinc, or another metal to form a contact bridge. In the present invention, a diaphragm of suitable size and material is rigidly attached to one end of the capacitor foil roll so that an electrical and mechanical bond is produced. A wire or tab leading to a cover terminal connection is then attached to the dome such that when the dome is deflected by pressure during the fault, the electrical contact is broken between the dome and the end of the capacitor foil roll. The capacitor roll with the interrupter is placed in a suitable case or housing and enough potting agent is introduced to produce a hermetic seal of the dome to the case bottom. A suitable impregnating oil is introduced into the case so that only one-fourth to one-third of the capacitor roll is not immersed in said oil. A suitable potting agent is then poured over tne oil so that after curing, the potting agent rigidly holds the capacitor fixed with respect to the case and hermetically seals the capacitor from the outside atmosphere. The diaphragm must be able to move with respect to the fixed roll such that the maximum possible travel of the diaphragm results in breaking the connection to the capacitor with no possible restrike of the device within 48 hours, but the capacitor roll and diaphragm must remain with the confines of the case. Interruption occurs before flame, gases or molten material can exit the case or cover. In the preferred embodiment the diaphragm is a dome-shaped, steel or metallic disc to permit flexing under pressure, the side of the dome being connected or welded to the tab, and the assembly is potted as described. When the pressure builds up within the device, the dome-shaped diaphragm goes from concave to convex, pulling away form the contact bridge.

DESCRIPTION OF THE PREFERRED EMBODIMENT

Figure 1:
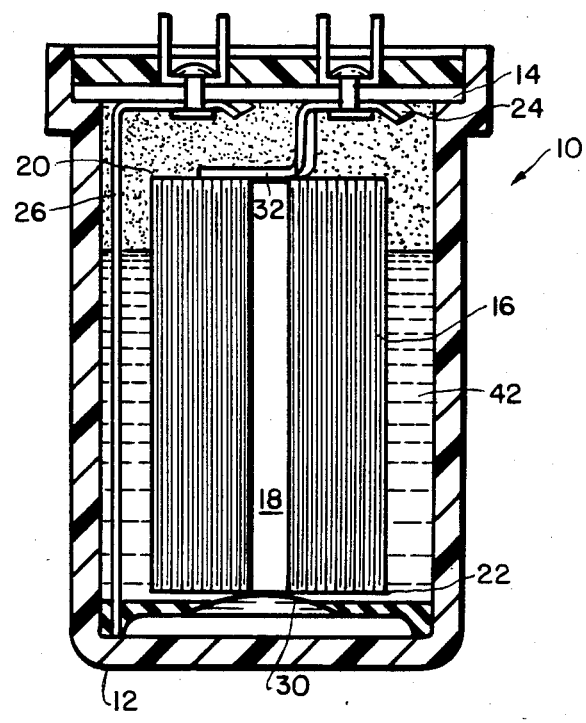
FIG. 1 is a cross sectional view of an oil impregnated metallized film AC motor start or motor run capacitor with the pressure sensitive fault interrupter of the present invention in place.

FIG. 1 illustrates an oil impregnated metallized film AC motor start or motor run capacitor 10 of typical construction. Capacitor 10 has a plastic case 12, a plastic cover 14 and contains a metallized film capacitor section or foil roll 16 wound on a central arbor which when withdrawn leaves a core 18. Capacitor section 16 has metallic contact bridges 20, 22 schooped and/or end sprayed on the ends of the foil roll, each bridge making contact with only one of the electrodes. Typically lead wires 24, 26 are electrically and mechanically secured to these bridges. As explained below, one lead is connected differently for the fault interrupter. The capacitor section 16 and the bottom lead 26 are potted in place within case 12.

FIG. 1 also shows the pressure sensitive fault interrupter of the present invention in an operational condition installed in typical AC motor start or motor run capacitor 10. The purpose of the fault interrupter is to isolate the oil impregnated metallized film capacitor from a power source when the capacitor has developed a complete or a partial short between the terminals of the capacitor and internal to the capacitor roll. During such a fault, pressure is developed within the roll as a result of the breakdown of the dielectric, producing various gases. These gases are able to exit the roll at the ends only. The fault interrupter of the present invention is designed to utilize the pressure developed at one end of the roll or any part thereof to break a contact as follows. A diaphragm 30 of suitable size and material, and having a domed shape, is rigidly attached to contact bridge 22 at the base of the capacitor foil roll 16 so that an electrical and mechanical bond is produced. Tab 26 is connected to diaphragm 30. The assembled device is then placed in case 12 leaving an air gap under the dome-shaped diaphragm. The wire or tab 26 is attached to the dome such that when the dome is deflected by pressure during the fault the electrical contact is broken between the diaphragm 30 and the schooped end 22 of the capacitor roll 16. This capacitor assembly is placed in a suitable case and enough potting agent 40 is introduced to produce a hermetic seal of the dome-shaped diaphragm 30 to the case bottom, leaving an air gap under the dome. A suitable impregnating oil 42 is introduced into the case so that only one-fourth to one-third of the capacitor is not immersed in said oil. A suitable potting agent 44 is then poured over the oil so that after curing the potting agent rigidly holds the capacitor fixed with respect to the case and hermetically seals the capacitor from the outside atmosphere. The diaphragm 30 must be able to move with respect to the fixed roll such that the maximum possible travel of the diaphragm results in breaking the connection to the capacitor roll 16 with no possible restrike of the device within 48 hours, but the roll and the diaphragm must remain within the confines of the case. The interruption must occur before flame or molten material can exit the case or covering. A metallic diaphragm with a tab connected or welded thereto has been utilized and the preferred potting agent was polyurethane. Before the unit is potted, a suitable plug or tape 32 is placed at the top of the core 18 to prevent the potting material from filling the core. The core 18 taped at one end provides a void space to direct the flow of the gases toward the diaphragm 30. When a fault occurs, gases will exert a downward pressure on the diaphragm 30 depressing it from the concave shape to a convex shape, thereby pulling the diaphragm 30 away from the bridge 22, that is the schooped base of the capacitor foil roll section 16. Thus, the action of depressing the diaphragm 30 breaks the contact and electrically isolates the capacitor from its power supply and stops further reaction within the roll.

The diaphragm 30 must be able to move relative to the fixed section 16 such that the maximum possible travel of the diaphragm 30 results in breaking the connection between the tab 26 and the bridge 22, with no possible restrikes in 48 hours, but both the diaphragm and the capacitor foil roll 16 must remain within the case 12. With the fault interrupter of the present invention, interruption will occur before flame or molten material can exit case 12. The diaphragm 30 suitably potted within the case maintains an air void at the bottom of the case where no gases may enter, thus eliminating the possibility of flame or explosion.

The pressure required to operate the fault interrupter of the present invention is between 5 and 100 p.s.i. The capacitor foil roll 16 can be from 0.75 inches to 3 inches in diameter. The diaphragm 30 can be made from aluminum or any other material that would provide the same action as described. The attachment of the diaphragm 30 to capacitor roll can be made through a connection to a tab or by direct connection to the schooped end of the roll.

The fault interrupter of the present invention differs significantly from and has many advantages over the prior art. It only uses normal connections; no special connections are required. It is a simple external device. No special case is required. The case does not require any special hermetic seal and the device works with a fully encapsulated capacitor foil roll without requiring the case dimensions to change in order to interrupt the circuit. A fault does not result in a deformation of the case.

What is claimed:

1. A metallized film AC capacitor having a pressure sensitive fault interrupter wherein said capacitor includes a metallized foil capacitor section, rolled around an arbor and having a core therein, contact bridges to one electrode of the capacitor section on each end thereof, a connecting tab to one contact bridge, a case, potting material to secure said capacitor section within said case at the top and bottom thereof, a liquid filling between the top and bottom potting material, and connecting terminals for said tabs in a cover for said case, wherein said fault interrupter comprises:

a diaphragm mechanically and electrically connected to one of said contact bridges at the end of capacitor roll remote from said cover;

a tab connection to said diaphragm, said tab connecting said diaphragm to one terminal on the cover of said case; a tape positioned over the top of said core, at the end opposite said diaphragm;

said capacitor section with said diaphragm connected thereto by an electrical and mechanical bond being positioned within said case;

a potting material disposed around the base of said capacitor roll and diaphragm attached thereto within said case;

a liquid inserted into said case covering approximately two-thirds to three-fourths of said capacitor roll;

a potting material placed over said liquid to hermetically seal the top of said capacitor roll to said cover;

said diaphragm secured to the bottom of said capacitor roll within said case leaving an air gap between said diaphragm and the base of said case such that said diaphragm may be depressed by gaseous pressure to break the electrical contact between said diaphragm and one contact bridge without the possibility of a restrike within 48 hours.

2. The capacitor of claim 1 wherein said diaphragm is dome-shaped having a concave shape in operational condition and a convex shape after depression.

3. The capacitor of claim 1 wherein said diaphragm is a metal.

4. The capacitor of claim 1 wherein said diaphragm is steel.

5. The capacitor of claim 1 wherein said potting material is polyurethane.

6. The capacitor of claim 1 wherein said diaphragm is directly connected to the contact bridge of said capacitor foil roll.

7. The capacitor of claim 1 wherein said liquid material is an oil impregnating agent.

* * * * *